United States Patent [19]
Elkind

[11] Patent Number: 5,832,003
[45] Date of Patent: Nov. 3, 1998

[54] VIDEO ERROR/DISTORTION CHECKER

[75] Inventor: Bob Elkind, Gaston, Oreg.

[73] Assignee: Tektronix, Inc., Wilsonville, Oreg.

[21] Appl. No.: 638,057

[22] Filed: Apr. 25, 1996

[51] Int. Cl.$^6$ ................................................. G06F 11/00
[52] U.S. Cl. ................................................. 371/48; 327/90
[58] Field of Search .................. 371/48, 67.1, 3, 371/5.1, 40.2, 37.9, 43.6, 51, 20.1, 20.4, 21.4, 25.1, 35, 36; 395/185.01; 364/737, 550; 324/606; 327/58, 65, 90, 93

[56] References Cited

U.S. PATENT DOCUMENTS

| | | | |
|---|---|---|---|
| 4,451,921 | 5/1984 | Odaka | 371/48 |
| 5,307,330 | 4/1994 | Okamura | 369/32 |
| 5,469,188 | 11/1995 | Krishnamurthy et al. | 345/117 |
| 5,488,618 | 1/1996 | Kondo et al. | 371/67.1 |
| 5,585,954 | 12/1996 | Taga et al. | 359/158 |
| 5,587,807 | 12/1996 | Ootsuka et al. | 386/46 |
| 5,610,541 | 3/1997 | Yoon | 327/143 |

*Primary Examiner*—Robert W. Beausoliel, Jr.
*Assistant Examiner*—Nadeem Iqbal
*Attorney, Agent, or Firm*—Francis I. Gray

[57] ABSTRACT

A video error/distortion checker generates a difference signal from an input repetitive digital signal and a reference data signal corresponding to the input repetitive digital signal. The difference signal is compared with maximum and minimum threshold values to generate an error signal when the difference signal exceeds either threshold value. The difference signal also is used to generate a running range value that is compared with a total range value to produce the error signal when during one iteration of the repetitive digital signal the difference signal exceeds a specified range defined by the total range value. The error signal is suitably displayed, either visually or alphanumerically or both, so that an operator may recognize the type, severity and location of errors in the repetitive digital signal.

7 Claims, 1 Drawing Sheet

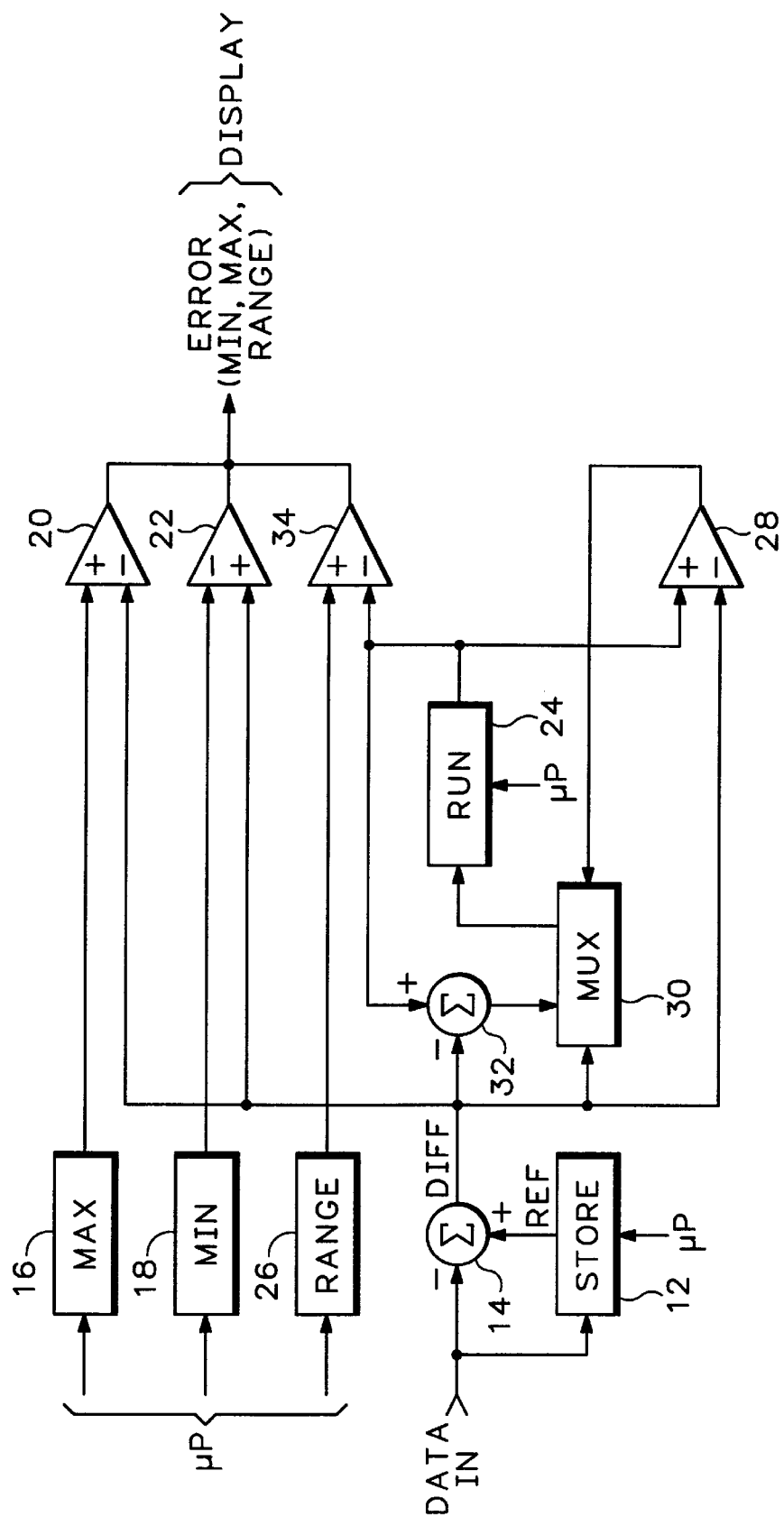

VIDEO ERROR/DISTORTION CHECKER

BACKGROUND OF THE INVENTION

The present invention relates to the verification of proper operation of equipment, and more particularly to a video error/distortion checker for evaluating whether equipment is operating within acceptable margins of error or is seriously malfunctioning.

A straight forward method of detecting errors in digital video equipment is to store in a buffer a copy of a repetitive signal and to compare the stored, or reference, signal to successive occurrences of the repetitive signal. An exact match between the reference signal and the received signal within specified limits indicates a properly functioning system. Various oscilloscopes, such as the Tektronix 2400 Series Digitizing Oscilloscopes manufactured by Tektronix, Inc. of Wilsonville, Oreg., United States of America, implement automatic pass/fail testing by comparing incoming signals against reference waveforms and alerting the operator in some manner if the incoming signal is out of limits. In two application areas such exact comparisons are not an adequate indicator of equipment quality. The first application is for PAL composite digital systems, and the second application is where non-lossless data compression is used.

In the first application a PAL composite digital signal is sometimes generated in a form commonly called "1135H" for its low cost, and then processed by a method called "sample rate conversion" to a form that is commonly called "4FSC", which is the required form for PAL composite digital signals. The sample rate conversion process introduces small uncertainties in the signal data, and the results of the introduced uncertainties vary over time. A constant signal in 1135H form processed to 4FSC form is no longer constant from video frame to video frame.

In the second application data compression is used to express an image or signal in a form that requires fewer data than an uncompressed signal. The compressed signal is ultimately decompressed, but the compression and decompression processing usually results in a signal that does not exactly match the original uncompressed signal.

What is desired is a video error/distortion checker that can distinguish between digital equipment operating within normal and acceptable error margins and digital equipment that is seriously malfunctioning for signals that are not exact replications of the original signal.

SUMMARY OF THE INVENTION

Accordingly the present invention provides a video error/distortion checker for verifying proper operation of digital equipment used with either PAL composite signals, data compressed signals, or non-lossless processed signals. A video frame buffer stores an iteration of a repetitive signal, the stored signal being a reference signal. Subsequent iterations of the repetitive signal are arithmetically subtracted on a data word by data word basis from the reference signal to form difference values. The difference values are compared with maximum and minimum threshold values contained in maximum and minimum threshold registers. The difference values also are compared to a running value in a running register, the running register being initialized with the minimum threshold value at the beginning of each iteration, by writing as the running value the difference value into the running register when the difference value is greater than the running value and an intermediate running value when the difference value is less than the running value, the intermediate running value being obtained by subtracting the difference value from the running value. The running value is compared with a total range value from a range register to determine whether an acceptable total range has been exceeded. The occurrence of errors may be visually and/or alphanumerically displayed to provide a recognizable indication with regard to their temporal location, severity and type.

The objects, advantages and novel features of the present invention are apparent from the following detailed description when read in conjunction with the appended claims and attached drawing.

BRIEF DESCRIPTION OF THE DRAWING

The FIGURE is a block diagram view of a video error/distortion checker according to the present invention.

DESCRIPTION OF THE PREFERRED EMBODIMENT

Referring now to the FIGURE a buffer memory 12 contains a reference signal REF in the form of data words that represent an iteration of a repetitive signal. REF may be obtained from a repetitive data input signal DATA IN, such as a television standard video signal, or from a microprocessor (not shown). DATA IN is input to a summing circuit 14 for subtraction from the reference signal from the buffer memory 12 to produce a difference signal DIFF. The microprocessor loads a pair of registers 16, 18 with a maximum threshold value and a minimum threshold value, respectively. DIFF is input to a pair of comparators 20, 22 for comparison with the maximum and minimum threshold values respectively. If either threshold value is exceeded by DIFF, an error signal ERROR is generated, indicating that DATA IN has exceeded the specified thresholds.

A running register 24 is initially loaded by the microprocessor with the minimum threshold value as a running value at the beginning of each iteration of DATA IN by the microprocessor. A range register 26 is loaded with a total range value by the microprocessor. The running value is input to a running comparator 28 for comparison with DIFF. The output of the running comparator 28 provides a select signal for a multiplexer 30. The running value also is input to a running summation circuit 32. DIFF is subtracted from the running value in the running summation circuit 32, and the result is input to one input of the multiplexer 30. DIFF is input to the other input of the multiplexer 30. The output of the multiplexer 30 is input as a new running value to the running register 24. The running value also is input to a range comparator 34 where it is compared with the total range value from the range register 26. If the running value exceeds the total range value, then ERROR is generated.

ERROR may be displayed as indicated in the research disclosure by Bob Elkind et al entitled "Visual Video Clipping Level Indication Display" published in the March 1996 Number 383 issue of *The International Journal* for companies seeking an alternative or supplement to obtaining patents on pages 199–200, incorporated herein by reference. The result is a display that provides ready recognition of the type, severity and location of error points generated from DATA IN. The microprocessor may keep track of the errors to provide an error summary in the form of an alphanumeric display in addition to or instead of the visual display.

In the case of input signal formats that include multiple channels, such as component video signals with luminance and two chrominance channels, this circuit would be replicated for each channel, and the results would be displayed differently so that the particular channel producing the error could also be identified.

Alternatively the video error/distortion checker may be implemented as a software program running on a general purpose computer or computer processor that receives as input DATA IN and generates ERROR as an output.

Thus the present invention provides a video error/distortion checker that subtracts a repetitive input data signal from a reference signal to generate a difference value for each data word, and then compares the difference value with maximum and minimum values and generates a running range value for comparison with a total range value to generate an error signal when the respective limits are exceeded.

What is claimed is:

1. A digital signal error detector comprising:

a difference generator for producing a signal difference value signal from a repetitive input data signal and a reference data signal that represents an iteration of the repetitive input data signal;

a limit detector to which the signal difference value signal is input for generating an error signal when the signal difference value signal is outside specified minimum and maximum threshold values;

a range detector for generating the error signal when a running difference value signal derived from the signal difference value signal exceeds a total range value, the range detector having a running register for storing a running value, the running register initially being loaded at the beginning of each iteration of the repetitive input data signal with an initial value as the running value, an update generator for updating the running value in the running register with the signal difference value signal when the signal difference value signal is greater than the running value and with the difference between the signal difference value signal and the running value when the signal difference value signal is less than the running value, and a range error detector for generating the error signal when the running value from the running register exceeds the total range value.

2. The digital signal error detector as recited in claim 1 wherein the range error detector comprises:

a range register for storing the total range value; and a range comparator for comparing the total range value from the range register with the running value from the running register to generate the error signal when the running value exceeds the total range value.

3. The digital signal error detector as recited in claim 1 wherein the update generator comprises:

a range summation circuit, having as inputs the running value and the signal difference value signal, for subtracting the signal difference value signal from the running value to produce an intermediate running value; and means for selecting the intermediate running value as the new running value to replace the running value in the running register when the signal difference value signal is less than the running value and for selecting the signal difference value signal to replace the running value in the running register when the signal difference value signal is greater than the running value.

4. The digital signal error detector as recited in claim 3 wherein the selecting means comprises:

a multiplexer having as inputs the intermediate running value and the signal difference value signal and as output for input to the running register the one of the inputs determined by a select signal; and means for generating from the running value and the signal difference value signal the select signal so that, when the signal difference value signal is less than the running value, the select signal causes the multiplexer to select the intermediate running value as the output and, when the signal difference value signal is greater than the running value, the select signal causes the multiplexer to select the signal difference value signal.

5. The digital signal error detector as recited in claim 4 wherein the generating means comprises a running comparator having as inputs the running value and the signal difference value signal and having as an output the select signal.

6. An apparatus for detecting errors in a repetitive digital signal comprising:

means for storing a reference signal representing an iteration of the repetitive digital signal;

means for obtaining a difference signal that represents the difference values between the reference signal and the repetitive digital signal;

means for generating an error signal when the difference signal is outside specified maximum and minimum threshold values; and means for generating the error signal when the variation in difference values of the difference signal exceeds a total range value, the error signal generating means for the total range value including means for storing a running value, the running value being set to a predetermined value at the beginning of each iteration of the repetitive digital signal, means for obtaining an intermediate running value from the difference signal and the running value, means for storing as the running value the intermediate running value when the difference signal is greater than the running value and the difference value from the difference signal when the difference signal is less than the running value, and means for comparing the running value with the total range value to generate the error signal.

7. A method of detecting errors in a repetitive digital signal comprising the steps of:

generating from the repetitive digital signal and a reference data signal a signal difference value signal, the reference data signal representing an iteration of the repetitive digital signal;

detecting when the signal difference value signal is outside specified maximum and minimum threshold values to generate an error signal; and detecting during each iteration of the repetitive digital signal whether the signal difference value signal fluctuates over a range of values greater than a total range value to generate the error signal including storing a running value in a running register, the running value being initiated with an initial value as the running value at the beginning of each iteration of the repetitive digital signal, updating the running value with the signal difference value signal when the signal difference value signal is greater than the running value and with an intermediate running value derived from the running value and the signal difference value signal when the signal difference value signal is less than the running value, and comparing the running value with the total range value to generate the error signal when the running value exceeds the total range value.

* * * * *